(12) United States Patent
Bryniarski

(10) Patent No.: US 7,371,699 B2
(45) Date of Patent: May 13, 2008

(54) NET-REINFORCED FILM STRUCTURE WITH MODIFIED STRAND PROFILE

(75) Inventor: David A. Bryniarski, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 10/895,196

(22) Filed: Jul. 19, 2004

(65) Prior Publication Data

US 2004/0259441 A1 Dec. 23, 2004

Related U.S. Application Data

(62) Division of application No. 09/510,857, filed on Feb. 23, 2000, now Pat. No. 6,774,062.

(51) Int. Cl.
*B32B 5/02* (2006.01)
*B32B 5/12* (2006.01)
*B32B 27/04* (2006.01)

(52) U.S. Cl. .............. 442/38; 442/41; 442/43; 442/49; 442/58; 428/107; 428/109; 428/110; 428/156; 428/167

(58) Field of Classification Search .............. 442/38, 442/41, 43, 49, 58; 428/107, 109, 110, 156, 428/167
See application file for complete search history.

(56) References Cited

U.S. PATENT DOCUMENTS

| | | | |
|---|---|---|---|
| 3,193,604 A | 7/1965 | Mercer | 264/209 |
| 3,214,320 A | 10/1965 | Lappala et al. | 161/89 |
| 3,349,434 A | 10/1967 | Hurea | 18/12 |
| 3,490,507 A | 1/1970 | Grashorn | 150/1 |
| 3,595,722 A | 7/1971 | Dawbarn | 156/177 |
| 3,616,130 A | 10/1971 | Rogosch | 161/57 |
| 3,884,935 A | 5/1975 | Burns, III | 206/322 |
| 4,207,983 A | 6/1980 | Wolske | 206/554 |
| 4,265,853 A | 5/1981 | Havens | 264/519 |
| 4,265,956 A | 5/1981 | Colijn | 428/134 |
| 4,285,998 A | 8/1981 | Thibodeau | 428/35 |
| 4,315,963 A | 2/1982 | Havens | 428/35 |
| 4,340,558 A | 7/1982 | Hendrickson | 264/151 |
| 4,348,445 A | 9/1982 | Craig | 428/138 |
| 5,490,596 A | 2/1996 | Katz | 206/439 |
| 5,586,732 A | 12/1996 | Yamauchi et al. | 241/168 |
| 6,774,062 B1 * | 8/2004 | Bryniarski | 442/38 |

FOREIGN PATENT DOCUMENTS

| | | |
|---|---|---|
| EP | 0 677159 | 6/1996 |
| EP | 0 742093 | 11/1996 |
| FR | 2 153 216 | 9/1971 |

(Continued)

*Primary Examiner*—Ula C Ruddock
(74) *Attorney, Agent, or Firm*—Baker Botts LLP

(57) ABSTRACT

A net-reinforced film structure includes a film layer and a netting attached to the film layer having a pattern of netting strands. The netting strands are sealed to an opposing film structure, which may be either a similar net-reinforced film or a standard sheet of film, along a linear seal area. The netting strands in the non-sealed areas of the net-reinforced film structure are free from attachment to the opposing film structure. The netting strands along the linear seal area have a wider cross-section than the netting strands at the non-sealed areas, and this wider cross-section facilitates the sealing process.

21 Claims, 2 Drawing Sheets

| | FOREIGN PATENT DOCUMENTS | | | GB | 2 289 398 | 11/1995 |
|----|----|----|----|----|----|----|
| FR | 2 703 704 | 4/1993 | | JP | 82037452 | 8/1982 |
| FR | 2 718 509 | 4/1994 | | JP | 82037453 | 8/1982 |
| FR | 2 748 417 | 5/1996 | | | | |
| GB | 2 128 462 | 5/1984 | | * cited by examiner | | |

NET-REINFORCED FILM STRUCTURE WITH MODIFIED STRAND PROFILE

This is a division of application Ser. No. 09/510,857, filed Feb. 23, 2000 now U.S. Pat. No. 6,774,062.

FIELD OF THE INVENTION

The present invention relates generally to net-reinforced films and, more particularly, relates to a net-reinforced film having a modified netting strand profile to facilitate seal alignment and increase seal strength when the netting is sealed to an opposing netting strand or film.

BACKGROUND OF THE INVENTION

Film sheeting for use in waste bags, food storage bags, and other packages can be made stronger by the attachment or coextrusion of a netting onto the film layer. To use such films for bags or other packages, it is often necessary to seal one section of film to another in a heat seal process. Such seals are necessary, for example, at the sides and/or the bottoms of food storage bags and waste bags. The addition of netting complicates the sealing process because it can be difficult to line up netting strands with each other or with a heating element to assure a complete and strong seal when net-reinforced films must be sealed to each other. Further, sealing films along a thin netting strand can result in a weak seal.

Common net-reinforced films include a uniform profile for the netting strands over the entire span of the net. Sealing is commonly accomplished by the application of heat by a heating element along the seal point. Though the uniform-strand configuration has become standard in the art, it contains netting strands along seal points having the same thin profile as netting strands in the rest of the net. This thinness at the seal points makes it difficult to achieve complete, strong seals because the manufacturer must perfectly align a thin seal strand, a heating element, and an opposing thin seal strand or film.

SUMMARY OF THE INVENTION

Accordingly, an object of the present invention is to provide a net-reinforced film that allows for stronger seals between pieces of film and, at the same time, allows for greater mechanical tolerances in the sealing process.

These objects are achieved by altering the netting strand profiles at seal points. Creating a wider netting profile at seal points allows for greater mechanical tolerances when aligning strands with each other or with a heating element during the seal process. In addition, altering the netting strand profile to have a wider seal area at the seal points enables a stronger seal to be formed than is formed using the standard, thinner netting strand profile at the seal points. Consequently, there is a need for net-reinforced films that have altered netting strand profiles at seal points.

This and other objects are realized by providing a unique net-reinforced film structure. The net-reinforced film structure includes a film layer and a netting attached to the film layer having a pattern of netting strands. The netting strands are sealed to an opposing film structure along a generally linear seal area. The opposing film structure may be either a similar net-reinforced film or a standard non-reinforced film sheet. The netting strands in the non-sealed areas of the net-reinforced film structure are free from attachment to the opposing film structure. The netting strands along the linear seal area have a wider cross-section than the netting strands at the non-sealed areas, and this wider cross-section facilitates the sealing process.

The above summary of the present invention is not intended to represent each embodiment, or every aspect of the present invention. This is the purpose of the following figures and detailed description.

BRIEF DESCRIPTION OF THE DRAWINGS

Other objects and advantages of the invention will become apparent upon reading the following detailed description and upon reference to the drawings in which.

Figure 1:
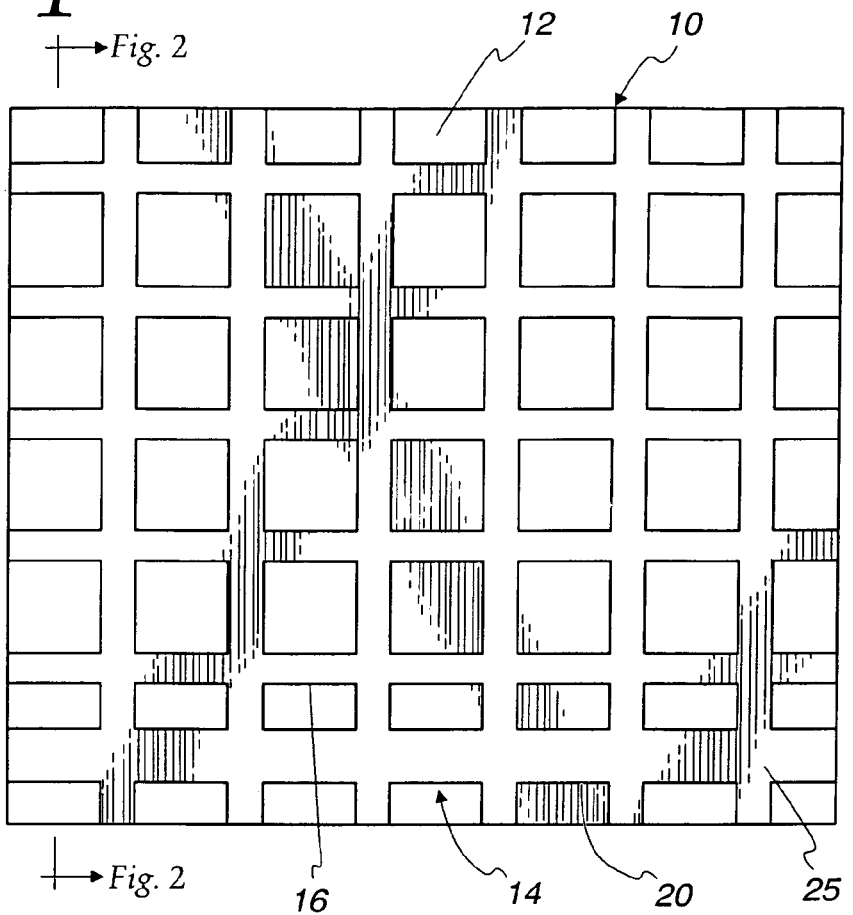
FIG. 1 is a top view of a net-reinforced film structure embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE EMBODIMENTS

Turning now to the drawings, FIG. 1 of the drawings shows a top view of a net-reinforced film 10 embodying the present invention. The net-reinforced film 10 comprises a film layer 12 reinforced with a netting 14. In one embodiment, the film layer 12 is formed by coextrusion with the netting 14. In this embodiment, the film layer 12 may consist of a thermoplastic such as, for example, low-density polyethylene (LDPE), linear low-density polyethylene (LLDPE), high-density polyethylene (HDPE), metallocene, ethylene vinyl acetate (EVA), or blends of these. The netting 14 may consist of, for example, LLDPE, HDPE, polypropylene, polyethylene, polypropylene/polyethylene copolymer, or metallocene. The thermoplastics used to make the netting 14 and the film layer 12 are selected such that the netting can be bound to the film through coextrusion at the film formation step without the use of an additional adhesive layer.

Figure 2:
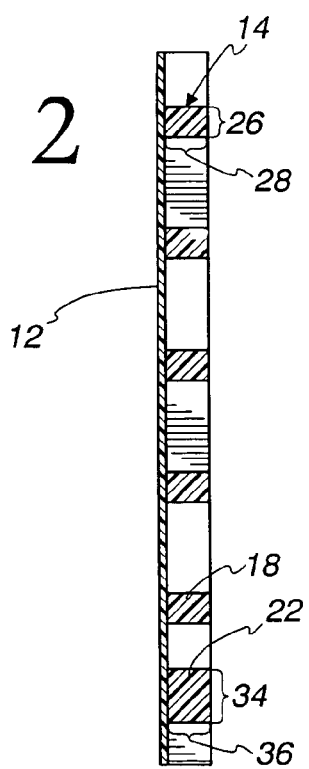
FIG. 2 is a sectional view taken generally along line 2-2 in FIG. 1.

The netting 14 is formed during the extrusion process such that two different profiles exist for different types of netting strands. Standard netting strands 16 are formed using a standard strand profile 18, as shown in FIG. 2, while seal netting strands 20 are formed with a modified strand profile 22. The standard strand profile 18 has a rectangular cross-section with width 26 and depth 28 being roughly equal and ranging from about 5 mils to 50 mils. The modified strand profile 22, having width 34 and depth 36, is wider and potentially shallower than standard strand profile 18, facilitating the sealing process by allowing greater mechanical tolerances and allowing for a stronger seal between the seal netting strand 20 and an opposing seal netting strand 24 (see FIG. 3) or an opposing film. The modified strand profile 22 may have a width ranging from about 125 mils to 250 mils and a depth ranging from about 5 mils to 50 mils. The film layer 12 may have a width ranging from about 0.2 mils to 8 mils.

The standard netting strands 16 and seal netting strands 20 of the netting 14 meet at intersections such as intersection 25. The strand widths at these intersections may remain constant or they may be wider than the strand widths at non-intersecting areas. Further, the depth of these intersections may be roughly equivalent to the strand depths at non-intersecting areas or they may have up to twice the depth of the strands at non-intersecting areas.

Figure 3:
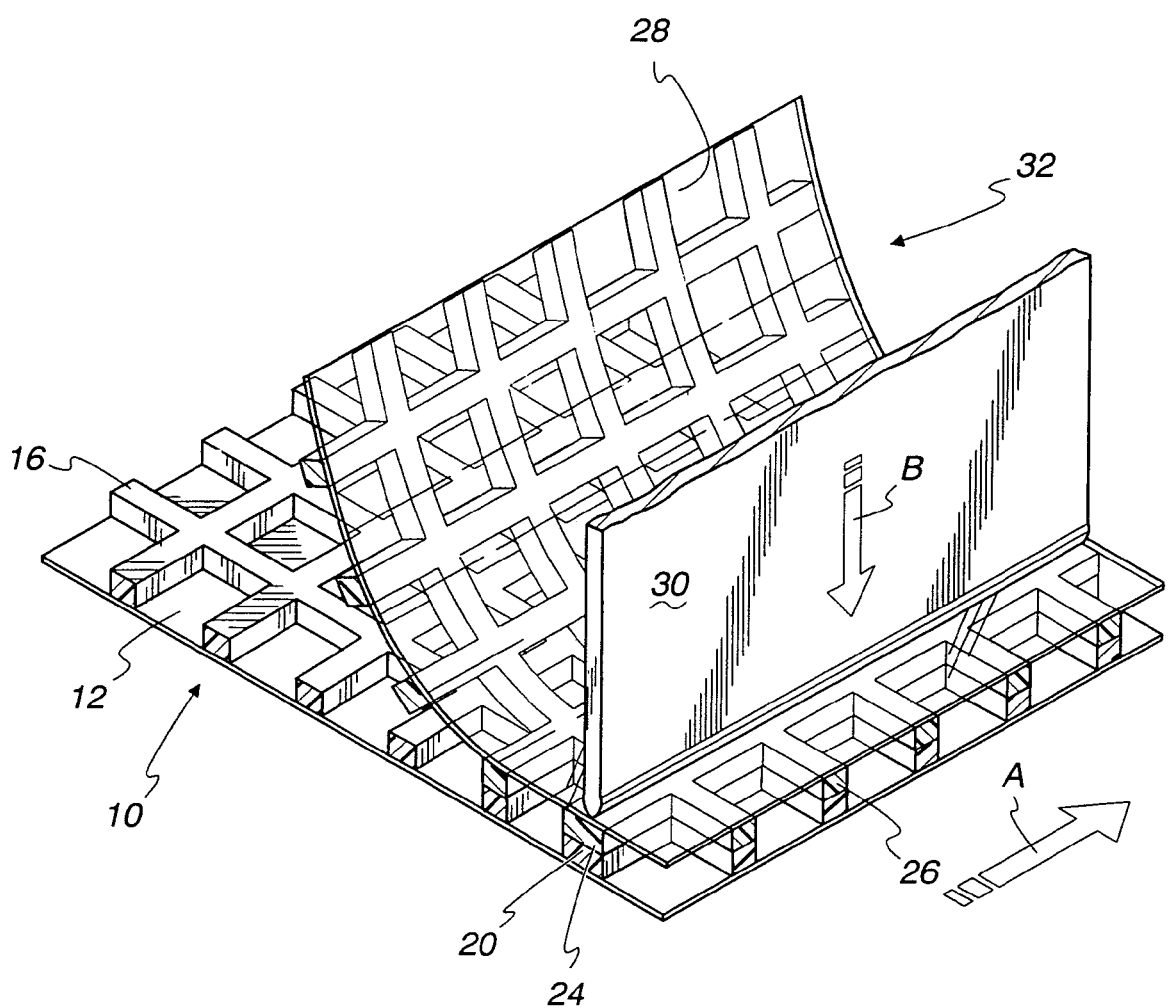
FIG. 3 is an isometric view of the net-reinforced film structure in the process of being sealed to an opposing film structure.

FIG. 3 is an isometric depiction of the seal strand 20, which is coextruded and affixed to the film layer 12 and the standard strands 16, in the process of being heat-sealed to an opposing seal strand 24. The opposing seal strand 24 is coextruded with and affixed to an opposing film layer 28 and opposing standard strands 26. As the net-reinforced film 10 propagates in the direction shown by the arrow A along with the opposing net-reinforced film 32 past a heat sealing element 30, the heat sealing element 30 contacts the seal area from above, moving in the direction shown by the arrow B, and forms a strong heat seal between the seal netting strand 20 and the opposing seal netting strand 24. The heat sealing element 30 may be comprised of any of several heating elements known in the art, such as a single hot bar, a dual hot bar sealer, or a hot wire through teflon tape.

Because both the seal netting strand 20 and the opposing seal netting strand 24 are formed using substantially the same modified strand profile 22, a significantly greater margin for error in aligning the seal netting strands 20 and 24 and the heat sealing element 30 can be achieved than if seal strands had the same profile as standard strands. This increases the possible speed and efficiency of the process, because small adjustments to alignment will not have to be made. Further, the increased widths of the seal netting strand 20 and the opposing seal netting strand 24 allow for more surface area contact by the heat sealing element 30, giving rise to a stronger seal than could be achieved if the seal netting strands were formed with the standard strand profile 18.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A net-reinforced film structure, comprising:
   a film layer, and
   a netting attached to said film layer and having a pattern of netting strands, said netting being sealed to an adjacent film structure along one or more generally linear seal areas and being free of attachment to said adjacent film structure at non-seal areas, the netting strands at said seal areas having a wider cross-section than the netting strands at said non-seal areas at a time prior to sealing said netting to said adjacent film structure along said one or more generally linear seal areas, wherein all the netting strands having the wider cross-section are located in seal areas.

2. The film structure of claim 1 wherein the netting strands at said seal areas have a shallower cross-section than the netting strands at said non-seal areas at a time prior to making said generally linear seal at said generally linear seal area.

3. The film structure of claim 1 wherein the film layer is comprised of a film material selected from a group consisting of low-density polyethylene, linear low-density polyethylene, high density polyethylene, metallocene, ethylene vinyl acetate, and blends of these.

4. The film structure of claim 1 wherein the netting is comprised of a netting material selected from a group consisting of linear low-density polyethylene, high-density polyethylene, polypropylene, polyethylene, polypropylene/polyethylene copolymer, and metallocene.

5. The film structure of claim 1 wherein the netting strands at the seal areas have a width greater than or equal to about 60 mils.

6. The film structure of claim 1 wherein the netting strands at the non-seal areas have a width greater than or equal to about 5 mils.

7. The film structure of claim 1 wherein said adjacent film structure is an opposing film layer.

8. The film structure of claim 1 wherein said adjacent film structure is an opposing net-reinforced film structure.

9. A net-reinforced film structure, comprising:
   a film layer; and
   a netting attached to said film layer and having a pattern of netting strands, said pattern being comprised of standard netting strands and seal netting strands, the seal netting strands having a wider cross-section than the standard netting strands, and the standing netting strands being free of attachment to said film layer, wherein all the netting strands having the wider cross-section are seal netting strands.

10. The net-reinforced film structure of claim 9 wherein said netting strands are placed in an orthogonal pattern.

11. The net-reinforced film structure of claim 9 wherein neighboring ones of said netting strands are spaced greater than or equal to about 0.25 inches from each other.

12. The film structure of claim 9 wherein the seal netting strands have a shallower cross-section than the standard netting strands.

13. The film structure of claim 9 wherein the film layer is comprised of a film material selected from a group consisting of low-density polyethylene, linear low-density polyethylene, high density polyethylene, metallocene, ethylene vinyl acetate, and blends of these.

14. The film structure of claim 9 wherein the netting is comprised of a netting material selected from a group consisting of linear low-density polyethylene, high density polyethylene, polypropylene, polyethylene, polypropylene/polyethylene copolymer, and metallocene.

15. The film structure of claim 9 wherein the sealing strands have a width greater than or equal to about 60 mils.

16. The film structure of claim 9 wherein the standard strands have a width greater than or equal to about 5 mils.

17. The film structure of claim 9 wherein the netting is sealed to an adjacent film structure.

18. The film structure of claim 17, wherein the film structure is an opposing film layer.

19. The film structure of claim 17 wherein said adjacent film structure is an opposing net-reinforced film structure.

20. The net-reinforced film structure of claim 9 wherein the seal netting strands are attached to the film layer at an edge of the film layer.

21. A net-reinforced film structure, comprising:
   a film layer, and a netting layer having a pattern of netting strands, the pattern of netting strands including seal netting strands and standard netting strands, the seal netting strands having a wider cross section than the standard netting strands, wherein the seal netting strands are attached to the film layer and the standard netting strands are free of attachment to the film layer, wherein all the netting strands having the wider cross-section are seal netting strands and the seal netting strands are attached to the film layer at an edge of the film layer.

* * * * *